United States Patent
Soneda et al.

(10) Patent No.: US 9,439,128 B2
(45) Date of Patent: Sep. 6, 2016

(54) NODE DEVICE AND COMMUNICATION METHOD FOR GENERATING CLUSTER

(71) Applicant: FUJITSU LIMITED, Kawasaki-shi, Kanagawa (JP)

(72) Inventors: Tatsuya Soneda, Fukuoka (JP); Tadashige Iwao, Kawasaki (JP); Tetsu Yamamoto, Fukuoka (JP); Norihito Nishimoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 221 days.

(21) Appl. No.: 14/246,521

(22) Filed: Apr. 7, 2014

(65) Prior Publication Data

US 2014/0219209 A1    Aug. 7, 2014

Related U.S. Application Data

(63) Continuation of application No. PCT/JP2011/073586, filed on Oct. 13, 2011.

(51) Int. Cl.
  *H04W 40/02* (2009.01)
  *H04W 40/30* (2009.01)
  *H04W 40/32* (2009.01)
  (Continued)

(52) U.S. Cl.
  CPC ............ *H04W 40/02* (2013.01); *H04L 45/025* (2013.01); *H04W 40/30* (2013.01); *H04W 40/32* (2013.01); *H04L 45/026* (2013.01); *H04W 84/18* (2013.01)

(58) Field of Classification Search
  None
  See application file for complete search history.

(56) References Cited

U.S. PATENT DOCUMENTS

| 5,999,712 A * | 12/1999 | Moiin | G06F 9/5061 370/254 |
| 6,993,034 B1 * | 1/2006 | Block | H04L 29/12783 370/390 |
| 2003/0227931 A1 * | 12/2003 | Chen | H04L 12/4633 370/408 |

(Continued)

FOREIGN PATENT DOCUMENTS

| JP | 2003-78530 | 3/2003 |
| JP | 2007-235444 | 9/2007 |
| WO | WO 2009/130918 | 10/2009 |

OTHER PUBLICATIONS

International Search Report mailed Nov. 22, 2011 in corresponding International Patent Application No. PCT/JP2011/073586.

(Continued)

*Primary Examiner* — Anh-Vu Ly
*Assistant Examiner* — Hector Reyes Ortiz
(74) *Attorney, Agent, or Firm* — Staas & Halsey LLP

(57) ABSTRACT

A node device includes a transmitter, processor, and a receiver. The receiver receives a packet from an adjacent node device. The processor generates a cluster list and a first hello packet. The cluster list records device identification information of a node device included in a cluster. The cluster is a group of node devices for which route information is stored. The first hello packet reports the route information with cluster identification information of the cluster. The transmitter broadcasts the first hello packet. Upon receipt of, from a free-node device that does not belong to a cluster, a second hello packet that includes information that associates the cluster identification information with device identification information of the free-node device, the processor adds the device identification information of the free-node device to the cluster list until a number of node devices recorded in the cluster list reaches a threshold.

8 Claims, 16 Drawing Sheets

(51) Int. Cl.
  *H04L 12/751*   (2013.01)
  *H04W 84/18*    (2009.01)

(56) References Cited

U.S. PATENT DOCUMENTS

| | | | |
|---|---|---|---|
| 2004/0003111 A1* | 1/2004 | Maeda | H04L 45/02 |
| | | | 709/237 |
| 2007/0201418 A1 | 8/2007 | Kobayashi et al. | |
| 2007/0299950 A1* | 12/2007 | Kulkarni | H04L 45/00 |
| | | | 709/223 |
| 2011/0141932 A1 | 6/2011 | Iwao et al. | |
| 2011/0258270 A1* | 10/2011 | Shin | H04L 67/1046 |
| | | | 709/206 |

OTHER PUBLICATIONS

Japanese Office Action dated Apr. 7, 2015 in corresponding Japanese Patent Application No. 2013-538400.

PCT International Preliminary Report on Patentability mailed Apr. 24, 2014 in corresponding International Application No. PCT/JP2011/073586.

* cited by examiner

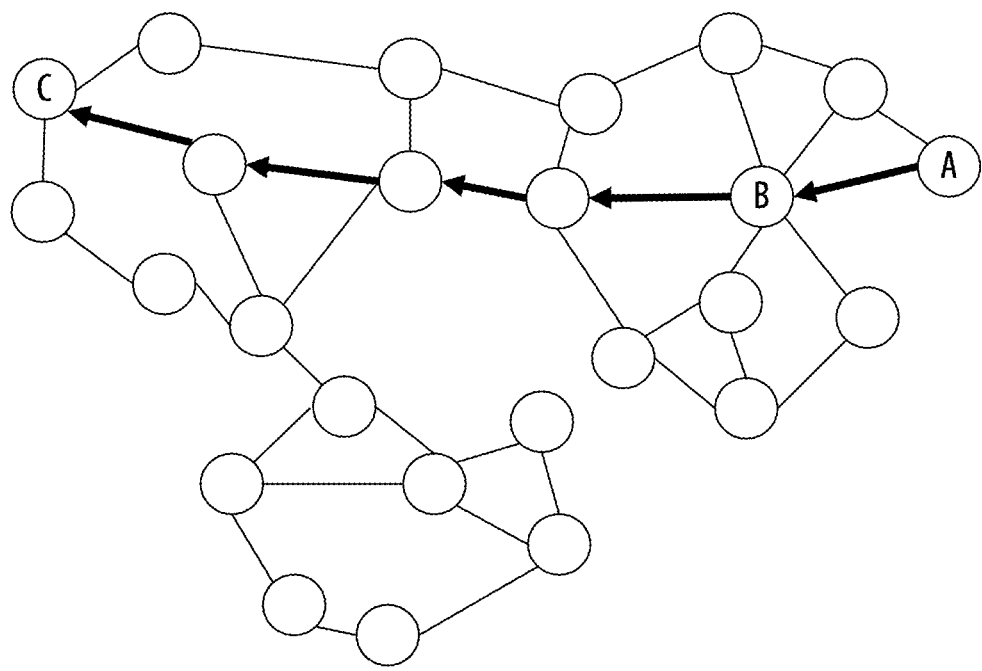
F I G. 1

| NODE CLASSIFICATION / DESTINATION | FREE NODE | MEMBER NODE | START-POINT NODE |
|---|---|---|---|
| JOINING PROCESS UNIT | ○ | × | × |
| CLUSTER-LIST UPDATING UNIT | × | ○ | × |
| CLUSTER GENERATING UNIT (OUTPUT DESTINATION OF CLUSTER INFORMATION) | × | × | ○ |
| NODE-LIST GENERATING UNIT (OUTPUT DESTINATION OF FREE NODE INFORMATION) | × | ○ | × |

FIG. 5

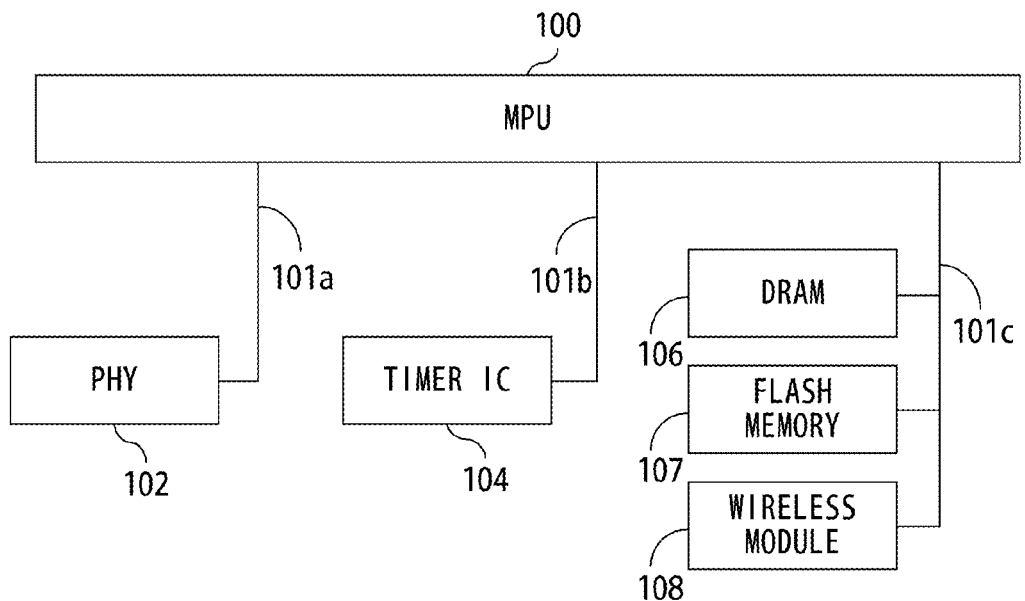
F I G. 6

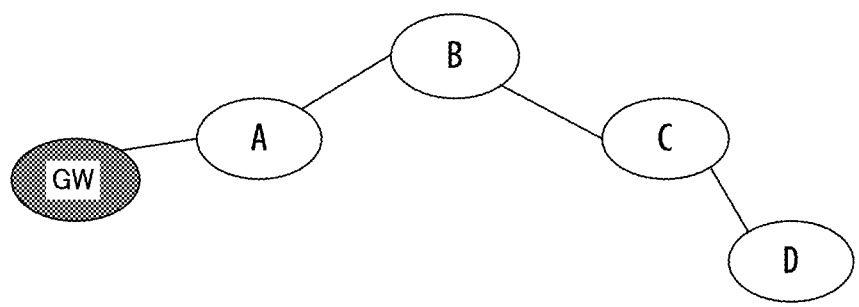
F I G. 7

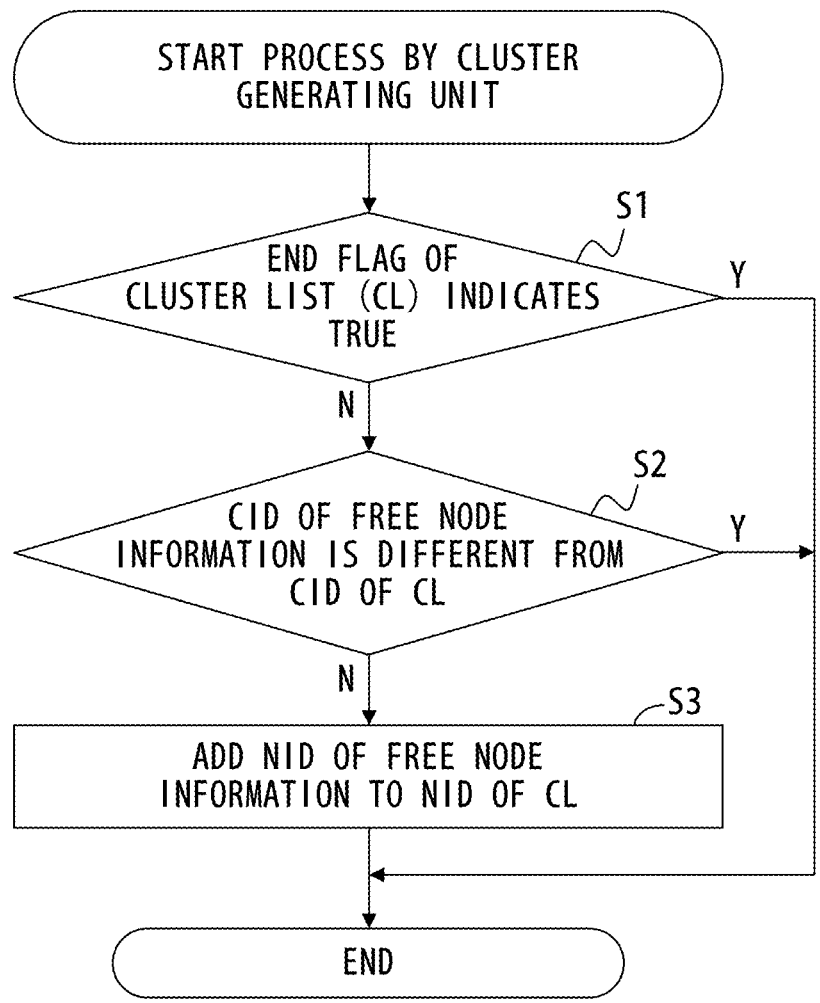
F I G. 10

NODE DEVICE AND COMMUNICATION METHOD FOR GENERATING CLUSTER

CROSS-REFERENCE TO RELATED APPLICATION

This application is a continuation application of International Application PCT/JP2011/073586 filed on Oct. 13, 2011 and designated the U.S., the entire contents of which are incorporated herein by reference.

FIELD

The embodiments discussed herein are related to a node device and a method for a communication between a plurality of node devices that belong to a network.

BACKGROUND

A node device that belongs to a wireless ad-hoc network uses a Hello packet to cause routing information to propagate. As an example, a node device A that belongs to an ad-hoc network illustrated in FIG. 1 generates and periodically broadcasts a Hello packet that includes routing information held by the node device A. Upon receipt of the Hello packet, a node device B compares routing information held by the node device B with information included in the Hello packet and obtains from the Hello packet routing information that the node device B did not hold. In addition, the node device B obtains route quality information from the Hello packet and performs a communication using a route with quality information that is as good as possible. The quality information also includes loop information. In this way, using Hello packets, node devices that belong to an ad-hoc network learn information on a route to another node device in the network and perform a communication using the optimum route that has been obtained. Each node device within the ad-hoc network holds, in a routing table, routes to the other node devices within the ad-hoc network. As an example, the node device A holds, in a routing table, information on a route to each of the node devices within the ad-hoc network other than the node device A. Hence, the node device A may transmit a data packet to a node device C via, for example, the node device B. The node devices used in such an ad-hoc network include a node device that includes, for each ultimate destination of a packet, a weighting table to store weighting information for a node that serves as a relay. In the transferring of a packet, the node device references a weighting table associated with the destination node of the packet so as to specify a node that is a destination to which the packet is relayed.

However, in a method wherein each node device records, in a routing table, routes to the other node devices within an ad-hoc network, an increase in the number of node devices within the network leads to larger-size routing tables. Accordingly, a method has been devised wherein node devices within a network are divided into clusters, and each node device stores, in a routing table, information on routes to the node devices within the same cluster.

As a related art, a wireless communication device has been devised that includes a storage device, a group division device, a communication-route selecting device, and a relay device. The wireless communication device determines, according to route information stored in the storage device, a cluster to which it should belong, and stores the result in the storage device.

Several documents such as International Publication No. 2009/130918 and Japanese Laid-open Patent Publication No. 2003-78530 are known.

A control packet is used in the generating of a cluster. As an example, the wireless communication device that determines a cluster to which it should belong according to route information stored in the storage device, i.e., a device described above as a related art, transmits and receives control packets in joining and leaving a cluster. In the case of unicast-transmission of control packets or flooding of control packets toward all of the node devices within the network, processes of transmitting, receiving, and relaying the control packets lead to a problem of an increased load on the node devices within the network.

SUMMARY

According to an aspect of the embodiments, a node device is provided. The node device includes a transmitter, processor, and a receiver. The receiver receives a packet from an adjacent node device. The processor generates a cluster list that records device identification information of a node device included in a cluster from among the plurality of node devices within the network. Here, the cluster is a group of node devices for which route information is stored. The processor generates a first hello packet that is a hello packet used to report the route information with cluster identification information of the cluster being stored in this hello packet. The transmitter broadcasts the first hello packet. Upon receipt of, from a free-node device that does not belong to a cluster, a second hello packet that includes information that associates the cluster identification information with device identification information of the free-node device, the processor adds the device identification information of the free-node device to the cluster list until a number of node devices recorded in the cluster list reaches a threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an exemplary ad-hoc network.

FIG. 5 illustrates an exemplary table stored by a node classification determining unit.

FIG. 6 illustrates an exemplary hardware configuration of a node device.

FIG. 7 illustrates an exemplary ad-hoc network before formation of a cluster.

FIG. 10 is a flowchart illustrating exemplary operations performed by a cluster generating unit.

DESCRIPTION OF EMBODIMENTS

Figure 2:
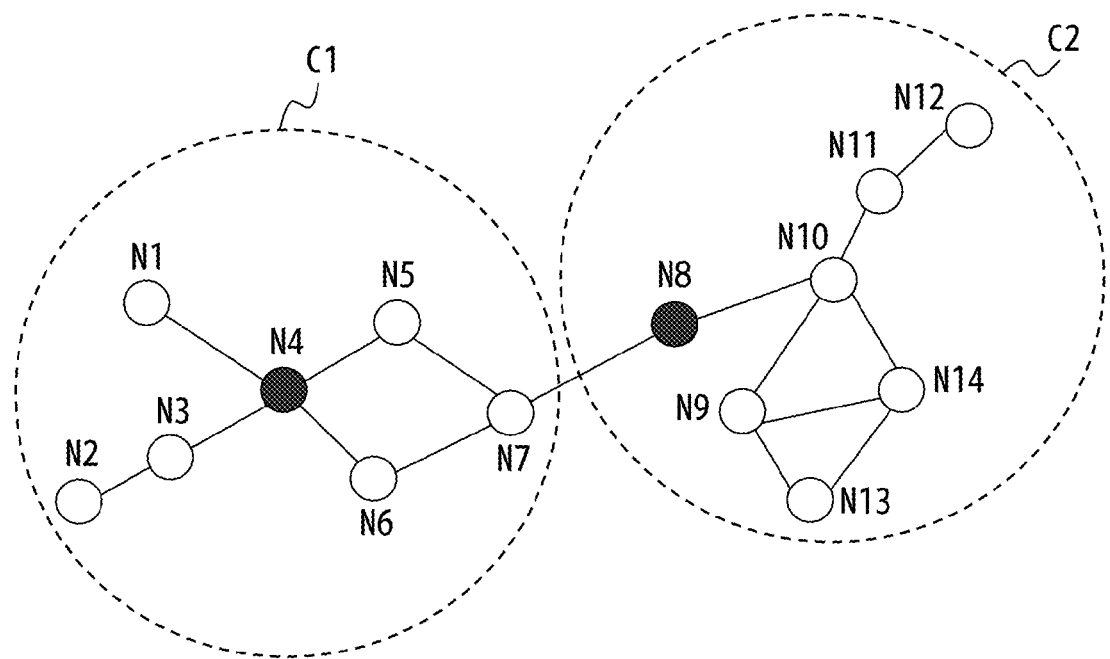
FIG. 2 illustrates an exemplary network in which clusters have been generated.

FIG. 2 illustrates an exemplary network in which clusters have been generated. An ad-hoc network depicted in FIG. 2 includes fourteen node devices, nodes N1-N14, and solid lines link adjacent node devices. A plurality of node devices placed within a distance that can transmit packets to or receive packets from each other may hereinafter be referred to as "adjacent" nodes. A node device located within a range where a packet transmitted from a certain node device is receivable may hereinafter be referred to as an "adjacent node" of the certain node device. As an example, a hello packet transmitted from a certain node device is received by an adjacent node of the source node device. Hello packets will hereinafter refer to packets used to report route information of a network. The route information includes information to specify an adjacent node and route information that the adjacent node holds in a routing table.

In FIG. 2, a node N4 from among the nodes included in an ad-hoc network is designated as a starting-point node. The "starting-point node", a node device that starts generation of a cluster, generates a cluster that includes the starting-point node itself. In this example, the node N4 generates a cluster C1 that includes the node N4. At the moment when the node N4 starts generation of a cluster, none of the nodes N1-N3 and N5-N14 belong to a cluster. A node device that does not belong to a cluster may hereinafter be referred to as a "free node".

A start-point node broadcasts a hello packet that includes the identifier of a generated cluster and the identifier of a node device that joins the cluster. A free node recognizes the identifier of the generated cluster from the hello packet transmitted from the start-point node. In addition, to join a cluster, the free node generates and broadcasts a hello packet that includes information that associates the identifier of the cluster with the identifier of the free node. In the example of FIG. 2, receiving the hello packet received from the start-point node N4, the nodes N1, N3, N5, and N6 that are adjacent to the node N4 recognize the identifier of the cluster C1 that has been in the process of generation. The nodes N1, N3, N5, and N6 do not belong to a cluster, and hence, when these nodes recognize the identifier of the cluster C1, they decide to join the cluster C1. Accordingly, the nodes N1, N3, N5, and N6 each use a hello packet to broadcast information that associates the identifier of the node with the identifier of the cluster C1.

Receiving a notification of the identifier of a node associated with the identifier of the generated cluster C1, the start-point node N4 recognizes that a request for permission to join the cluster C1 has been received. Accordingly, in accordance with the received hello packet, the start-point node N4 recognizes the node intended to join the generated cluster and adds this node to the cluster. The node device that has been added to the cluster checks, from a hello packet from the start-point node, that the node device is included in the cluster. A node that has joined a cluster may hereinafter be referred to as a "member node". A member node broadcasts a hello packet that includes the identifier of the cluster that this node has joined. Recognizing the identifier of the cluster under generation from the hello packet generated by the member node, a free node joins the cluster using the aforementioned procedure. Such processes are repeated until the number of node devices included in the cluster reaches a threshold.

When the number of node devices included in the cluster reaches the threshold, the start-point node broadcasts a hello packet that includes information that requests generation of a new cluster (generation request). A member node that has received the generation request generates and broadcasts a hello packet that includes the received generation request. A free node that has received the hello packet that includes the generation request is operated as a new start-point node and starts to generate a cluster. In the example of FIG. 2, the threshold is 7, and a hello packet that includes a generation request is broadcast after the nodes N1-N7 join the cluster C1. Upon receipt of the hello packet that includes a generation request, the node N8 starts to generate a new cluster C2, which is generated using a method similar to the method for generating the cluster C1. When a cluster is generated, each node device records in a routing table a route to another node within the same cluster.

As described above, in a method in accordance with an embodiment, information used to generate a cluster is transmitted or received using a hello packet. Hence, the load generated via a node device transmitting or receiving a packet during the generating of a cluster is smaller than that of generating a cluster using a special control packet. In addition, generating a cluster eliminates the need for each node device to store routes to all of the node devices included in an ad-hoc network. Hence, the size of the routing table of each node device becomes small in comparison with those in a situation in which an ad-hoc network is not divided into clusters. This reduces the load incurred by each node device storing route information. In addition, information used to generate a cluster is transmitted and received using hello packets, so that the consumption of frequency band caused by transmission or reception of information to generate the cluster can be made to be small in comparison with what would be caused in a situation in which control packets are used. Hence, the frequency band usable to transmit or receive data becomes large in comparison with what is usable in the case of using control packets.

<Device Configuration>

Figure 3:
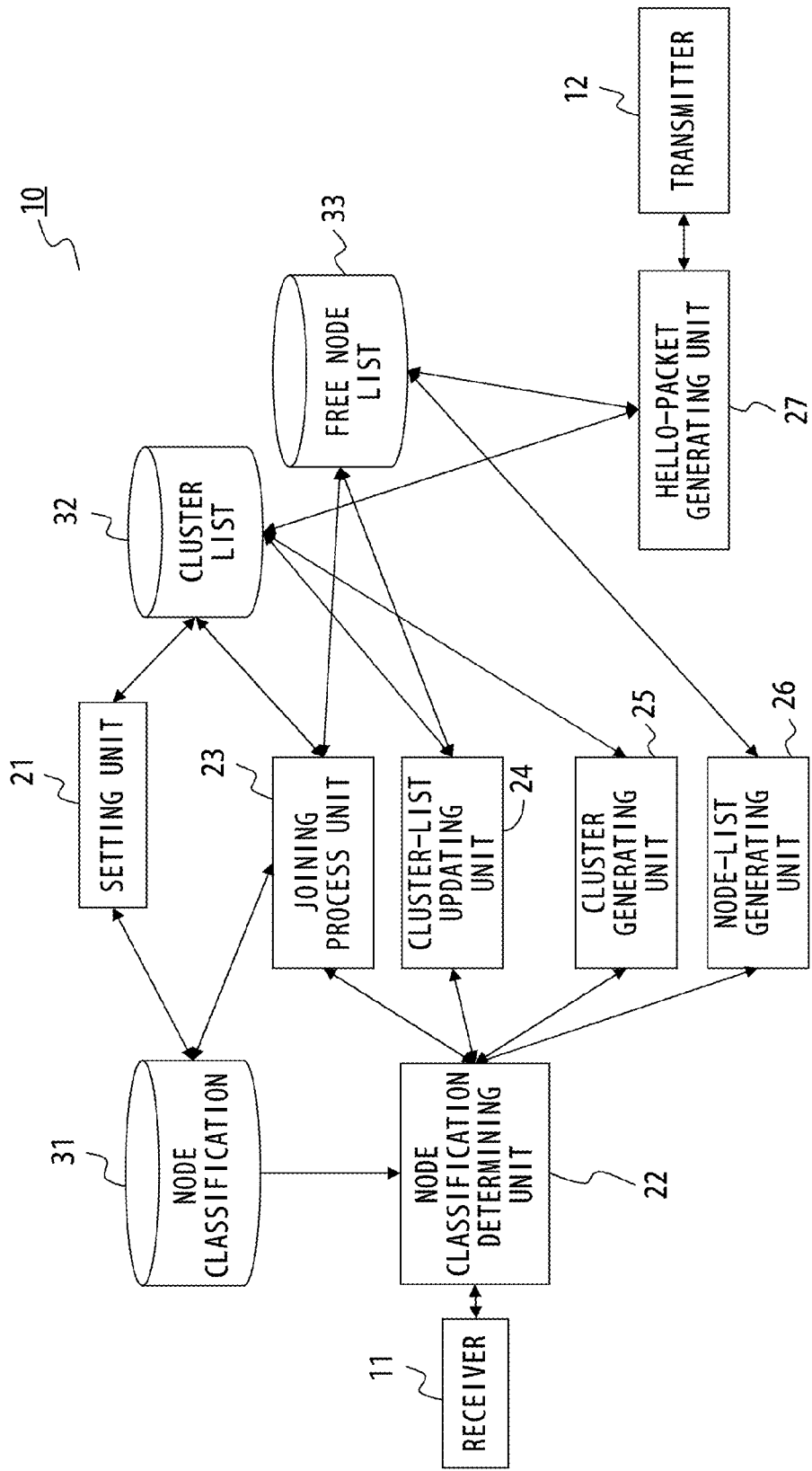
FIG. 3 illustrates an exemplary configuration of a node device.

FIG. 3 illustrates an exemplary configuration of a node device 10. The node device 10 includes a receiver 11, a transmitter 12, a setting unit 21, a node classification determining unit 22, a joining process unit 23, a cluster-list updating unit 24, a cluster generating unit 25, a node-list generating unit 26, and a hello-packet generating unit 27. In addition, the node device 10 stores node classification information 31, a cluster list 32, and a free node list 33.

The receiver 11 receives a packet transmitted from an adjacent node device 10 and outputs a hello packet to the node classification determining unit 22. The transmitter 12 transmits a packet to the adjacent node device 10. For example, the transmitter 12 transmits a hello packet generated by the hello-packet generating unit 27 to the adjacent node device 10.

Figure 4A:
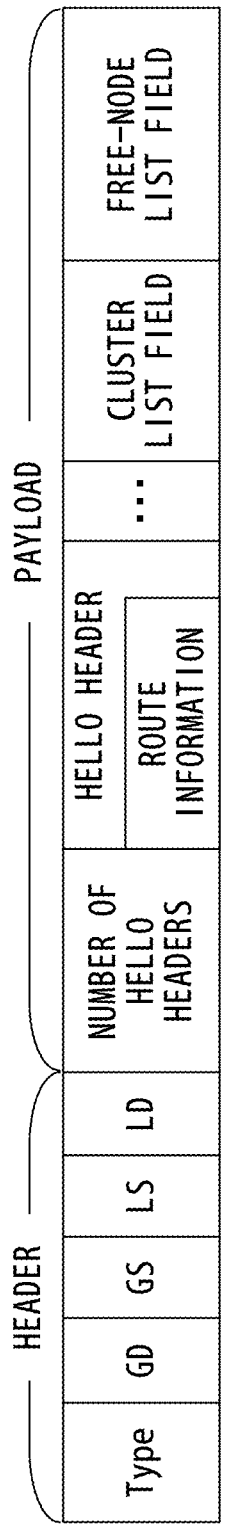
FIGS. 4A-4C illustrate exemplary formats of a hello packet.
Figure 4B:
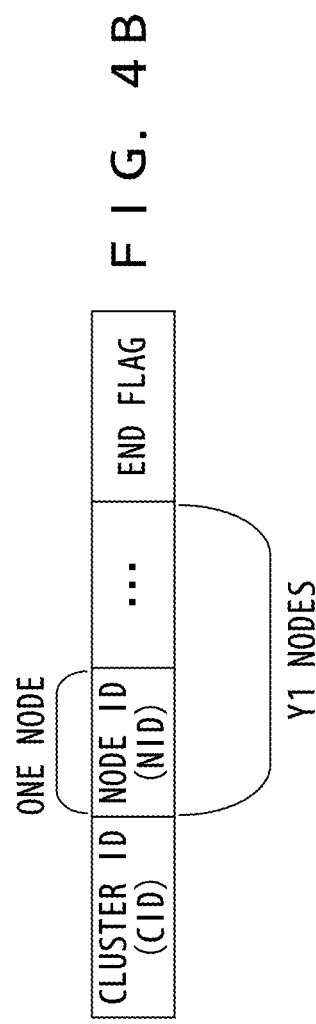
Figure 4C:
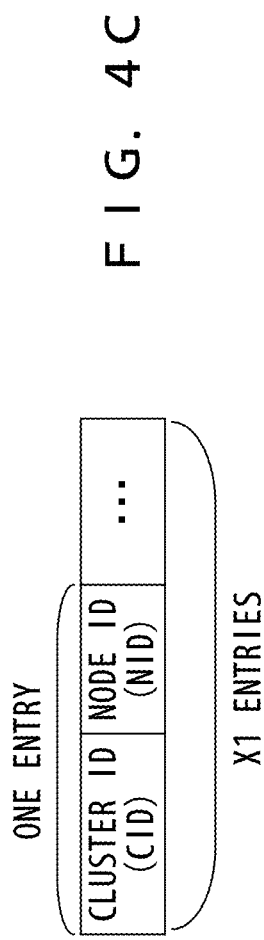

FIGS. 4A-4C illustrate exemplary formats of a hello packet. As depicted in FIG. 4A, the hello packet includes a header and a payload. The header includes a type field, a global destination (GD) field, a global source (GS) field, a local source (LS) field, and a local destination (LD) field. The "global destination" will hereinafter indicate a node device 10 that is the ultimate destination of a packet. Meanwhile, the "local destination" indicates a node device 10 designated as a destination in a one-hop transfer performed to transmit a packet to a global destination. The "local source" indicates a node device 10 from which a packet is transferred in a one-hop transfer of the packet. The "global source" indicates a node device 10 that has generated a packet. A hello packet is broadcast to the node devices adjacent to a source node device 10, and hence the GD and the LD are broadcast addresses indicative of all adjacent nodes, and the GS and the LS are the addresses of node devices 10 that have generated the hello packets. The type field records information indicative of the type of data included in a payload. In the case of a hello packet, the value of the type field is set to a value that specifies the hello packet. The receiver 11 identifies the hello packet using the value of the type field and outputs the hello packet to the node classification determining unit 22.

A payload includes information indicative of the number of Hello headers, a Hello header, a cluster list field, and a free-node list field. Each Hello header includes route information. The route information includes the identifier of a GD, a route to which is stored in a routing table (not illustrated) of a node device 10 that generates a hello packet.

The cluster list field records information on the cluster list 32 held by a node device 10 that is the source of a hello packet. Information recorded in the cluster list field may hereinafter be referred to as "cluster information". FIG. 4B depicts an example of a cluster list. The cluster list has recorded therein a cluster identifier (CID), a list of the identifiers of node devices included in a cluster identified by the cluster identifier (device identifier, NID, node identifier), and an end flag. The end flag is information indicating whether a new node device 10 can join the cluster identified by the cluster identifier. An end flag that indicates information of "true" means that the number of nodes included in a cluster has reached a threshold, which indicates that a new node device 10 cannot join the cluster. As will be described hereinafter, a hello packet that includes the cluster list 32 with end flag=true is used as information to request generation of a new cluster (generation request). Meanwhile, an end flag that indicates information of "false" means that the number of nodes included in a cluster has not reached the threshold, which indicates that a new node device 10 can join the cluster. Accordingly, the cluster list 32 has recorded therein anode included in a cluster and information indicating whether a node device 10 is addable to the cluster. As depicted in FIG. 4B, the cluster list 32 includes an arbitrary number of device identifiers. The cluster list 32 does not necessarily need to include an end flag. An end flag is a value indicating whether the number of nodes in a cluster has reached an upper limit. Accordingly, when the cluster list 32 does not include an end flag, the node device 10 may use, for example, the number of node IDs included in a cluster list so as to determine whether a new node device 10 can join a cluster. Descriptions will hereinafter be given of an exemplary situation in which the cluster list 32 includes an end flag.

The free-node list field has recorded therein information within a free node list 33 included in a node device 10 that is the source of a hello packet. Information recorded in a free-node list field may hereinafter be referred to as "free node information". FIG. 4C depicts an example of the free node list 33. The free node list 33 includes information that includes a pair of the identifier of a free node and the cluster identifier of a cluster that the free node attempts to join. The free node list 33 includes an arbitrary number of combinations of the identifier of a free node and the identifier of a cluster.

The setting unit 21 sets a node device 10 as any of a start-point node, a member node, and a free node, and records, in node classification information 31, information to specify the classification of the node device 10. Node classification information 31 is information in an arbitrary format with which the classification of the node device 10 can be specified.

When a hello packet is input from the receiver 11, the node classification determining unit 22 recognizes the classification of the node device 10 by accessing node classification information 31. The following descriptions are based on the assumption that the node classification determining unit 22 stores a table such as that depicted in FIG. 5. In the table of FIG. 5, node classifications are associated with the output destinations of cluster information and free node information within a hello packet. The node classification determining unit 22 outputs cluster information or free node information to the destinations indicated as "○" within sections of the table in FIG. 5. As an example, the node classification determining unit 22 within the free node outputs cluster information within a received hello packet to the joining process unit 23. The node classification determining unit 22 within the member node outputs cluster information to the cluster-list updating unit 24 and outputs free node information to the node-list generating unit 26. The node classification determining unit 22 within the start-point node outputs free node information within the received hello packet to the cluster generating unit 25.

When a node device 10 is a start-point node, the cluster generating unit 25 to which free node information has been input checks whether a cluster identifier within the free node information is identical with the identifier of a cluster generated by the start-point node. When these identifiers are identical with each other, the cluster generating unit 25 recognizes that a request for permission to join the cluster generated by the node that includes this cluster generating unit 25 has been received. Accordingly, when the number of node devices 10 included in the cluster is lower than a threshold, the cluster generating unit 25 adds the node device 10 included in free node information to the cluster and updates the cluster list 32.

When the node device 10 is a member node, the node-list generating unit 26 processes free node information, and the cluster-list updating unit 24 processes cluster information. A cluster to which a member node belongs may hereinafter be referred to as a "parent cluster".

To check whether cluster information reported by a hello packet is information related to a parent cluster, the cluster-list updating unit 24 checks whether a cluster identifier included in the cluster information is identical with the identifier of the parent cluster. The fact that these identifiers are identical with each other means that information on the parent cluster has been reported, and this causes the cluster-list updating unit 24 to update the cluster list 32 in accordance with the cluster information. In addition, the cluster-list updating unit 24 deletes from the free node list 33 node-related entries included in the cluster information. Meanwhile, when free node information is input, the node-list generating unit 26 adds anode identifier included in the free node information to the free node list 33.

When the node device 10 is a free node, the joining process unit 23 processes cluster information. The joining process unit 23 requests permission to join a cluster and checks whether the node device 10 has joined the cluster. Upon receipt of a hello packet, the joining process unit 23 checks a cluster identifier and the value of an end flag, both included in cluster information. In addition, the joining process unit 23 checks whether the free node list 33 holds an entry that includes the device identifier of the node that includes this joining process unit 23. When the node has already requested permission to join the cluster, the free node list 33 includes an entry that includes the device identifier of the node. Meanwhile, when the free node list 33 does not include an entry that includes the device identifier of the node, the node has not requested permission to join the cluster. Accordingly, to request permission to join a cluster to which the node can join (end flag=false), the joining process unit 23 records in the free node list 33 a combination of the cluster identifier within the cluster information and the identifier of the node.

Meanwhile, when the free node list 33 includes an entry that includes the device identifier of the node, the node has already requested permission to request the cluster. Accordingly, to check whether the node has joined the cluster, the joining process unit 23 checks whether cluster information includes the identifier of the node. When the cluster information includes the identifier of the node, the joining process unit 23 determines that the node has joined the cluster, updates the cluster list, and deletes the entry in the free node list 33. When the end flag in the cluster information indicates "true", the joining process unit 23 deletes the entry in the free node list. When the free node list does not include the device identifier of the node, upon receipt of cluster information whose end flag indicates "true", the joining process unit 23 designates the node as a start-point node, changes node classification information 31, and generates a cluster list 32.

The hello-packet generating unit 27 generates and outputs a hello packet to the transmitter 12. Formats of the hello packet are as depicted in FIGS. 4A-4C. The hello-packet generating unit 27 generates the hello packet using the cluster list 32 and the free node list 33. The hello-packet generating unit 27 provided in a member node or a start-point node may incorporate, into a hello packet, information recorded in a routing table.

FIG. 6 illustrates an exemplary hardware configuration of a node device 10. The node device 10 includes a micro processing unit (MPU) 100, buses 101 (101a-101c), a physical layer (PHY) chip 102, a timer IC 104, a dynamic random access memory (DRAM) 106, a flash memory 107, and a wireless module 108. The buses 101a-101c establish connections to allow data to be input and output between the MPU 100, the PHY chip 102, the timer IC 104, the DRAM 106, the flash memory 107, and the wireless module 108.

The MPU 100 performs a process by reading a program such as firmware stored in the flash memory 107. In this case, the MPU 100 may use the DRAM 106 as a working memory. The MPU 100 is operated as the setting unit 21, the node classification determining unit 22, the joining process unit 23, the cluster-list updating unit 24, the cluster generating unit 25, the node-list generating unit 26, and the hello-packet generating unit 27. The DRAM 106 may store the node classification information 31, the cluster list 32, the free node list 33, and a routing table, and, in addition, may store information used in a process performed at the MPU 100. The node classification information 31 may be stored in the flash memory 107. In this case, after startup, the node classification information 31 stored in the flash memory 107 is loaded into the DRAM 106. The PHY chip 102 and the wireless module 108 are operated as the receiver 11 and the transmitter 12. The PHY chip 102 is an optional element, and the node device 10 may perform a communication over a line via the PHY chip 102. For example, a node device 10 operated as a gateway between an L3 network and an ad-hoc network may communicate with a node device within the L3 network using the PHY chip 102. The timer IC 104 is used in the determining of a time to transmit a hello packet. According to time information obtained from the timer IC 104, the hello-packet generating unit 27 and the transmitter 12 may determine a timing at which a hello packet is transmitted.

A program such as firmware stored in a computer-readable storage medium may be installed on the node device 10. Alternatively, a program downloaded from a network via the PHY chip 102 or the wireless module 108 may be installed on the node device 10. In accordance with an embodiment, another type of storage device that is different from the DRAM 106 and the flash memory 107 may be used. The node device 10 may be achieved by a computer.

<First Embodiment>

FIG. 7 illustrates an exemplary ad-hoc network. The network illustrated in FIG. 7 includes five nodes GW and A-D. In FIG. 7, solid lines link adjacent nodes. As an example, an adjacent node of the node GW is the node A, and adjacent nodes of the node A are the nodes GW and B. Similarly, adjacent nodes of the node C are nodes B and D. The following descriptions are based on the assumption that, upon formation of an ad-hoc network, the node GW is set as a start-point node and the nodes A-D are set as free nodes.

Figure 8:
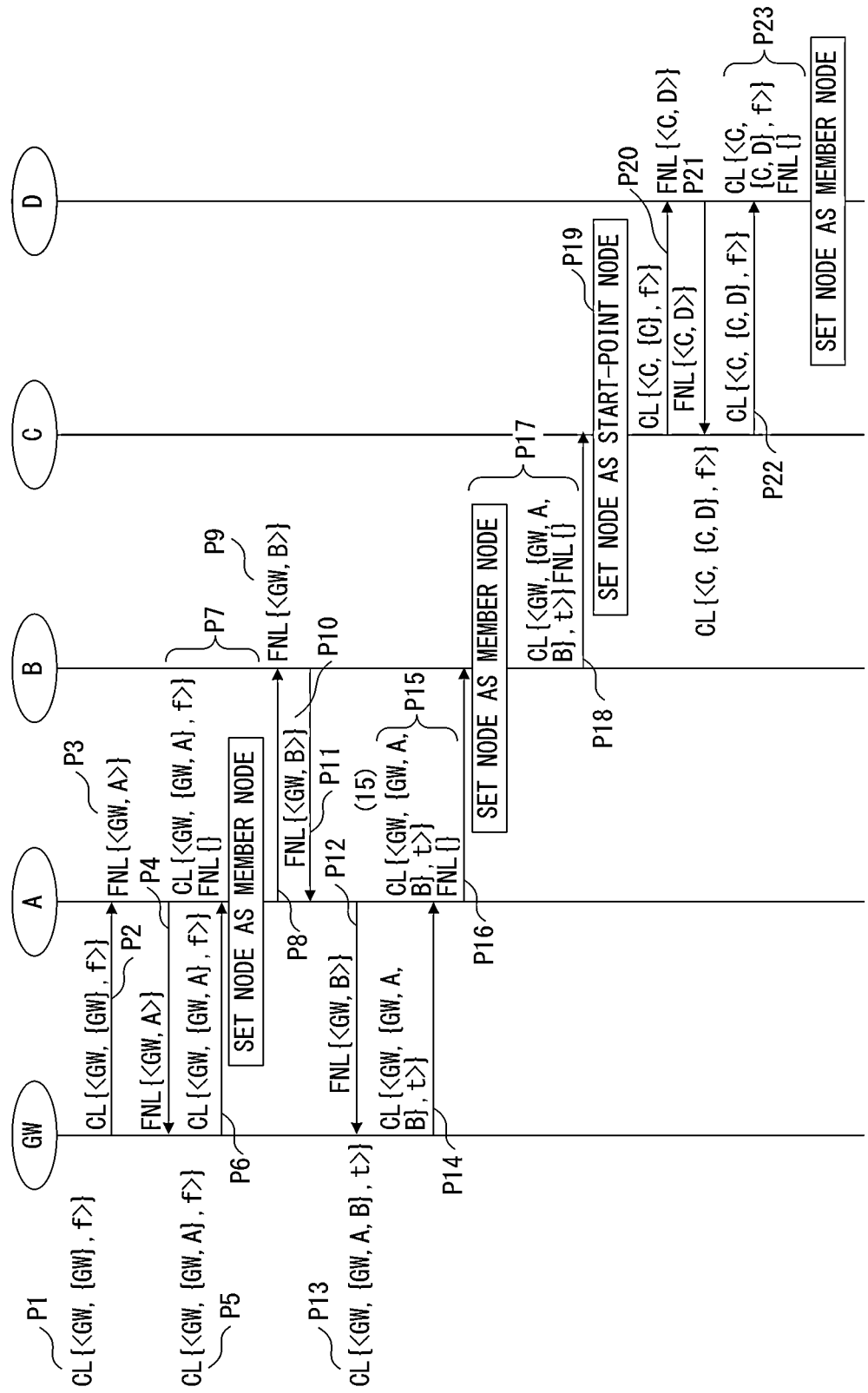
FIG. 8 is a sequence diagram illustrating exemplary operations performed in the generating of a cluster.

FIG. 8 is a sequence diagram illustrating exemplary operations performed in the generating of a cluster. With reference to FIG. 8, the following will describe operations of individual node devices 10 with respect to a situation in which a cluster is generated in the network of FIG. 7. The following descriptions are based on an exemplary situation in which the upper limit of the number of node devices 10 within the cluster (threshold) is 3, but the upper limit of the number of node devices 10 within the cluster may be an arbitrary integer that is 1 or larger. In addition, assume that, in the following description, the identifier of the cluster is the ID of the start-point node that has generated the cluster. As an example, the identifier of a cluster that includes the node GW as a start-point node is GW. In the following descriptions, to specify a cluster, the identifier of a cluster may be added to the right of the character string "cluster". For example, a cluster whose cluster identifier is GW may be indicated as "cluster GW". In FIG. 8, for the sake of viewability, an arrow indicative of transmission and reception of a hello packet is omitted when a node that has received the hello packet does not update the cluster list (CL) 32 or the free node list (FNL) 33.

Procedure P1 is as follows. The setting unit 21 of the node GW sets the node GW as a start-point node and stores in the node classification information 31 information indicating that the node GW is a start-point node. In addition, the setting unit 21 generates the cluster list 32 that records the cluster GW and information on the cluster GW. In this case, the setting unit 21 records in the cluster list 32 the identifier to identify the cluster GW (GW) and a node included in the cluster GW, and sets "false" (f) as an end flag.

Procedure P2 is as follows. The hello-packet generating unit 27 of the node GW generates a hello packet. The hello-packet generating unit 27 sets the address of the node GW as GS and LS within a header and sets, as GD and LD, a broadcast address indicating all adjacent nodes. In addition, the hello-packet generating unit 27 stores, in the cluster list field, information recorded in the cluster list 32. Hence, using the hello packet, the node GW may report information indicating the cluster identifier GW and end flag=false to the adjacent node.

The node GW is a start-point node. The free node list 33 does not include an entry, and hence the hello-packet generating unit 27 of the node GW does not incorporate free node information into the hello packet. In addition, a routing table has not been generated at that moment, and hence the hello-packet generating unit 27 does not incorporate route information of the routing table into the hello packet. Accordingly, using the hello packet, the node GW reports, to the node device 10 that receives the hello packet, route information indicating that the node GW is an adjacent node. The hello-packet generating unit 27 outputs the generated hello packet to the transmitter 12. The transmitter 12 broadcasts the hello packet.

Procedure P3 is as follows. Since the node A is an adjacent node of the node GW, the node A receives the hello packet transmitted from the node GW. Upon receipt of the hello packet via the receiver 11, the node classification determining unit 22 of the node A uses the node classification information 31 to recognize that the node A has been set as a free node. Accordingly, the node classification determining unit 22 outputs cluster information included in the hello packet to the joining process unit 23. Since the value of the end flag within the cluster information indicates "false", the joining process unit 23 recognizes that the number of node devices 10 included in the cluster GW is smaller than the threshold. Accordingly, the joining process unit 23 decides to cause the node A to join the cluster GW and stores the ID of the node A and the identifier of the cluster GW in association with each other in the free node list 33.

Procedure P4 is as follows. The hello-packet generating unit 27 of the node A generates a hello packet. In this case, the hello-packet generating unit 27 stores information recorded in the free node list 33 in a free node list field as free node information. Hence, using the hello packet, the node A may report to an adjacent node that the node A has attempted to join the cluster GW.

At this moment, the node A does not belong to any cluster, and, since the cluster list 32 does not have information recorded therein, the hello-packet generating unit 27 does not incorporate cluster information into the hello packet. A routing table has not been generated in the node A, and hence the hello packet also does not include route information from a routing table. Accordingly, using the hello packet, the node A reports, to an adjacent node, route information indicating that the node A is an adjacent node. In addition, the hello-packet generating unit 27 sets the address of the node as GS and LS within the header and sets, as GD and LD, a broadcast address indicating all adjacent nodes. The hello-packet generating unit 27 outputs the generated packet to the transmitter 12. The transmitter 12 of the node A broadcasts the hello packet.

Procedure P5 is as follows. The nodes GW and B receive the hello packet transmitted by the node A. Checking that the node GW is the start-point node, the node classification determining unit 22 of the node GW outputs free node information of the received hello packet to the cluster generating unit 25. The cluster generating unit 25 checks whether a cluster identifier included in the free node information is identical with the identifier of the generated cluster. When the cluster identifier included in the free node information is identical with the identifier of the generated cluster, the cluster generating unit 25 checks whether the node device 10 identified by the identifier included in the free node information is addable to the generated cluster.

In this example, the cluster generating unit 25 checks whether the cluster identifier is GW. Since the identifier of the node A is associated with the identifier of the cluster GW as described above with reference to procedure P4, the cluster generating unit 25 adds the node A to the cluster GW. The cluster generating unit 25 adds the identifier of the node A (A) to the cluster list 32 held by the node GW. After the node A is added, the cluster generating unit 25 compares the number of nodes included in the cluster GW with the threshold. At that moment, the cluster GW includes the nodes GW and A, and hence the number of node devices 10 within the cluster GW has not exceeded the threshold. Accordingly, the cluster generating unit 25 maintains the value of the end flag as "false".

Meanwhile, since the node B is a free node, the node classification determining unit 22 of the node B attempts to extract cluster information from the hello packet received from the node A so as to output the cluster information to the joining process unit 23. However, the hello packet transmitted by the node A in procedure P4 does not include cluster information. Accordingly, the node B ends the process related to generation of the cluster.

Procedure P6 is as follows. The hello-packet generating unit 27 of the node GW generates a hello packet. The setting of the header is similar to that in procedure P2. The hello-packet generating unit 27 stores, in a cluster list field, information recorded in the cluster list 32. Using cluster information of the hello packet generated at that time, the following information is reported to the adjacent node.

Cluster identifier: GW
Nodes that have joined the cluster GW: GW and A
End flag=false The generated hello packet is broadcast.

Procedure P7 is as follows. When the node A receives the hello packet from the node GW, the node classification determining unit 22 of the node A outputs cluster information within the hello packet to the joining process unit 23. The joining process unit 23 checks the cluster identifier included in the cluster information, nodes included in the cluster, and the value of the end flag. Since the node A has requested permission to join the cluster GW using the hello packet transmitted in procedure P4, the joining process unit 23 checks the identifiers of nodes included in the cluster so as to check whether the node A has been added to the cluster GW. The cluster information of the hello packet received at that time by the node A has recorded therein information indicating that the nodes GW and A have joined the cluster GW. Accordingly, recognizing that the node A has joined the cluster GW, the joining process unit 23 updates the cluster list 32. The updated cluster list 32 includes the following information.

Cluster identifier: GW
Nodes that have joined the cluster GW: GW and A
End flag=false The joining process unit 23 changes the setting of the node A from "free node" to "member node" by updating the node classification information 31. In addition, the joining process unit 23 compares the free node list 33 with cluster information and deletes the node included in the cluster information from the free node list 33. In this example, the node A was registered in the free node list 33 in procedure P3, and the cluster information received after procedure P3 includes the node A. Accordingly, the joining process unit 23 deletes the entry of the node A from the free node list 33.

Procedure P8 is as follows. The hello-packet generating unit 27 of the node A generates a hello packet. The hello-packet generating unit 27 stores information recorded in the cluster list 32 in the cluster list field as cluster information. Thus, using the hello packet, the node A may report to the adjacent node devices that the node A has joined the cluster GW, which node device 10 is included in the cluster GW, and that a node device 10 is still addable to the cluster GW. At that time, the node A does not hold information on a free node in the free node list 33, and hence the free-node list field of the hello packet does not include free node information. The setting of the header of the hello packet is similar to the one in procedure P4. The generated hello packet is broadcast.

Procedure P9 is as follows. The nodes GW and B receive the hello packet transmitted by the node A. Since the node B is a free node, the node classification determining unit 22 of the node B outputs to the joining process unit 23 the cluster information within the received hello packet. Since the value of the end flag included in the cluster information indicates "false", the joining process unit 23 recognizes that the number of node devices 10 included in the cluster GW is less than the threshold. Accordingly, the joining process unit 23 decides to cause the node B to join the cluster GW and stores the identifier of the node B and the identifier of the cluster GW in the free node list 33 in association with each other.

Meanwhile, as described above with reference to procedure P5, the node GW checks the free node information within the hello packet. The hello packet generated in procedure P8 does not include free node information, and hence the cluster generating unit 25 of the node GW does not perform a particular process.

Procedure P10 is as follows. The hello-packet generating unit 27 of the node B generates a hello packet. The generated hello packet is broadcast, thereby reporting to the adjacent nodes of the node B that the node B has attempted to join the cluster GW.

Procedure P11 is as follows. The node classification determining unit 22 of the node A receives the hello packet transmitted from the node B. Since the node A has been set as a member node in procedure P7, the node classification determining unit 22 of the node A outputs free node information to the node-list generating unit 26, as indicated in FIG. 5. The node-list generating unit 26 updates the free node list 33 of the node A using information included in the free node information. Accordingly, the updated free node list 33 of the node A has the combination of the ID of the node B and the identifier of the cluster GW stored therein.

Procedure P12 is as follows. The hello-packet generating unit 27 of the node A generates a hello packet. The hello-packet generating unit 27 stores information from the cluster list 32 in the cluster list field as cluster information and stores information from the free node list 33 in the free-node list field as free node information. Then, using the hello packet, the node A broadcasts information indicating that the node B has attempted to join the cluster GW.

Procedure P13 is as follows. The nodes GW and B receive the hello packet transmitted by the node A. The node classification determining unit 22 of the node GW outputs to the cluster generating unit 25 the free node information extracted from the hello packet. The cluster generating unit 25 adds the node B to the cluster GW by performing a process similar to the process performed in procedure P5 to add the node A to the cluster GW. After the node B is added, the cluster generating unit 25 compares the number of nodes included in the cluster GW with the threshold. At that time, the number of node devices 10 within the cluster GW is identical with the threshold, as the cluster GW includes the nodes GW, A, and B. Accordingly, the cluster generating unit 25 changes the value of the end flag to "true". As a result of such a process, the cluster list 32 of the node GW is updated as follows.

Cluster identifier: GW
Nodes that have joined the cluster GW: GW, A, and B
End flag=true Meanwhile, the node B is a free node, and hence, when the node classification determining unit 22 of the node B extracts cluster information from the hello packet received from the node A, the node classification determining unit 22 outputs the cluster information to the joining process unit 23. Information included in the cluster information is identical with the cluster information of the hello packet received by the node B in procedure P9, and the node B thus ends the process.

Procedure P14 is as follows. As in procedure P6, the node GW generates and broadcasts a hello packet.

Procedure P15 is as follows. When the node A receives the hello packet from the node GW, the node classification determining unit 22 of the node A outputs cluster information included in the hello packet to the cluster-list updating unit 24. The cluster information of the hello packet received at that time by the node A has recorded therein information indicating that the nodes GW, A, and B have joined the cluster GW. Accordingly, the cluster-list updating unit 24 updates the cluster list 32 in accordance with the cluster information. The updated cluster list 32 includes the following information.

Cluster identifier: GW
Nodes that have joined the cluster GW: GW, A, and B
End flag=true The cluster-list updating unit 24 compares the free node list 33 with the cluster information and deletes the node included in the cluster information from the free node list 33. In this example, the node B was registered in the free node list 33 in procedure P11, and the cluster information received after procedure P11 includes the node B. Accordingly, the cluster-list updating unit 24 deletes the entry of the node B from the free node list 33.

Procedure P16 is as follows. As in procedure P8, the hello-packet generating unit 27 of the node A generates and broadcasts a hello packet.

Procedure P17 is as follows. When the node B receives the hello packet from the node A, the node classification determining unit 22 of the node B outputs cluster information included in the hello packet to the joining process unit 23. Then, the joining process unit 23 of the node B performs an operation similar to the operation performed by the joining process unit 23 of the node A in procedure P7, thereby updating the cluster list 32 and the free node list 33. Consequently, the cluster list 32 does not include any entries, and the updated cluster list 32 includes the following information.

Cluster identifier: GW
Nodes that have joined the cluster GW: GW, A, and B
End flag=true In addition, the setting of the node B is changed from "free node" to "member node".

Procedure P18 is as follows. The hello-packet generating unit 27 of the node B generates and broadcasts a hello packet by performing a process similar to the process described with reference to procedure P8.

Procedure P19 is as follows. The nodes A and C receive the hello packet transmitted by the node B. At the node A, the hello packet received from the node B changes neither the cluster list 32 nor the free node list 33.

The node C is a free node, and hence, when the node classification determining unit 22 of the node C extracts cluster information from the received hello packet, the node classification determining unit 22 of the node C outputs the cluster information to the joining process unit 23. The value of the end flag included in the cluster information indicates "true", according to which the joining process unit 23 recognizes that the number of node devices 10 included in the cluster GW has reached the threshold. Accordingly, the joining process unit 23 recognizes that the node C cannot join the cluster GW and sets the node C as a start-point node. The joining process unit 23 changes the value of the node classification information 31 and generates a cluster C that includes the node C. Information included in the cluster list 32 generated at the time is as follows.

Cluster identifier: C
Node that has joined the cluster C: C
end flag=false

Procedure P20 is as follows. The node C generates and broadcasts a hello packet by performing a process similar to the process performed by the node GW in procedure P2.

Procedure P21 is as follows. The node D updates the free node list 33 by performing a process similar to the process performed by the node A in procedure P3. In the updated free node list 33, the identifier of the node D and the identifier of the cluster C are associated with each other. In addition, the node D generates and broadcasts a hello packet by performing a process similar to the process in procedure P4. Through this process, using the hello packet, the node D may report to an adjacent node that the node D has attempted to join the cluster C.

Procedure P22 is as follows. Upon receipt of the hello packet transmitted from the node D, the node C adds the node D to the cluster C by performing a process similar to the process performed by the node GW described with reference to procedure P5. In addition, the node C broadcasts a hello packet by performing a process similar to the process performed by the node GW described with reference to procedure P6.

Procedure P23 is as follows. Upon receipt of the hello packet from the node C, the node D updates the cluster list 32 and the free node list 33 and changes the setting to "member node". The operation at that time is similar to the operation of the node A described with reference to procedure P7.

Figure 9:
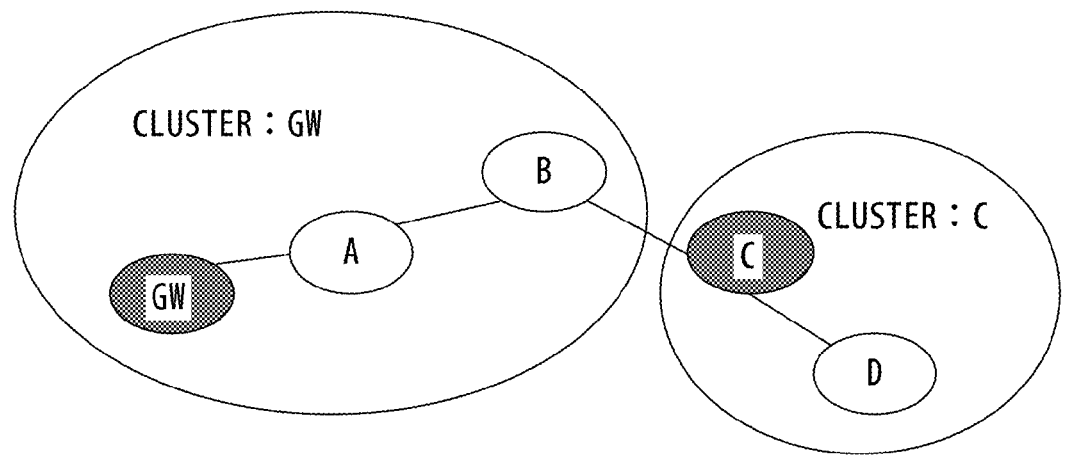
FIG. 9 illustrates an exemplary ad-hoc network after formation of clusters.

Through the aforementioned procedures, procedures P1-P23, the clusters GW and C are generated as depicted in FIG. 9. When a cluster is generated, each node device records, in a routing table, a route to another node device included in the parent cluster. To generate a routing table, the header and route information of a hello packet and a cluster identifier within cluster information are used. When a cluster identifier included in cluster information within a hello packet is the identifier of a parent cluster, each node device defines a node recorded in route information or an LS in the header as a GD in a routing table, and defines an LS of the hello packet as an LD in the routing table.

FIG. 10 is a flowchart illustrating exemplary operations performed by the cluster generating unit 25. By checking whether the value of the end flag of the cluster list (CL) 32 indicates true, the cluster generating unit 25 checks whether a new node device 10 is addable to a cluster (step S1). When the value of the end flag does not indicate true, a new node device 10 is addable to the cluster. In this case, the cluster generating unit 25 checks whether a node that has attempted to join the cluster generated by the node that includes this cluster generating unit 25 is specifiable using free node information that has been input. Accordingly, the cluster generating unit 25 compares the cluster identifier included in the free node information with the cluster identifier included in the cluster list 32 (No in step S1; step S2). When the free node information is identical with the cluster identifier included in the cluster list 32, the cluster generating unit 25 recognizes that a request has been made for permission to join the cluster generated by the node that includes this cluster generating unit 25 (No in step S2). In this case, the cluster generating unit 25 adds to the cluster the node identified by the node identifier included in the free node information (step S3). Meanwhile, when a judgment of "Yes" is indicated in step S1 or S2, the cluster generating unit 25 ends the process without adding a new node device 10 to the cluster.

Figure 11:
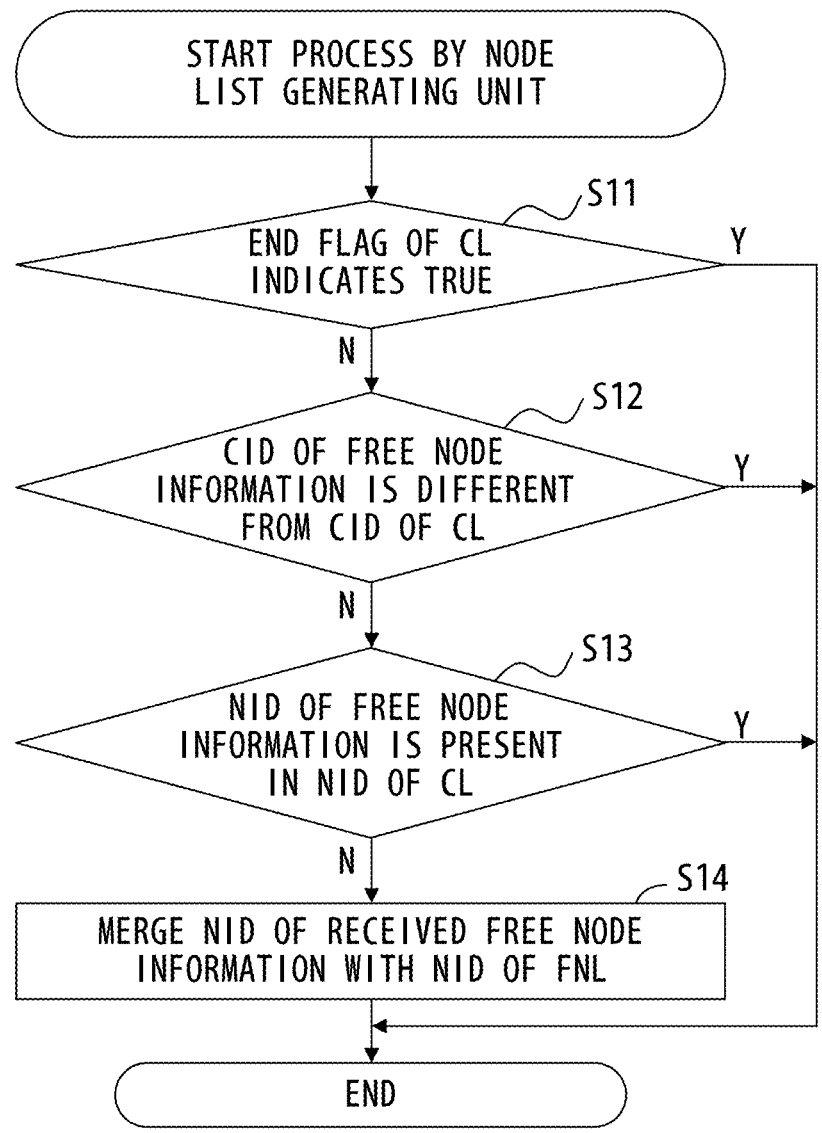
FIG. 11 is a flowchart illustrating exemplary operations performed by a node-list generating unit.

FIG. 11 is a flowchart illustrating exemplary operations performed by the node-list generating unit 26. The processes of steps S11 and S12 are similar to those of steps S1 and S2. In step S11, the node-list generating unit 26 checks whether a new node device 10 is addable to a parent cluster to which a member node belongs. When free node information is identical with a cluster identifier included in the cluster list 32, the node-list generating unit 26 recognizes that a request has been made for permission to join the parent cluster. In this case, the node-list generating unit 26 checks whether the cluster list 32 has recorded therein a node identifier included in the free node information (step S13). When the cluster list 32 does not have recorded therein the node identifier included in the free node information, the node identifier included in the free node information is added to the free node list 33 (No in step S13; step S14). Meanwhile, when a judgment of Yes is indicated in any of steps S11-S13, the node-list generating unit 26 ends the process.

Figure 12:
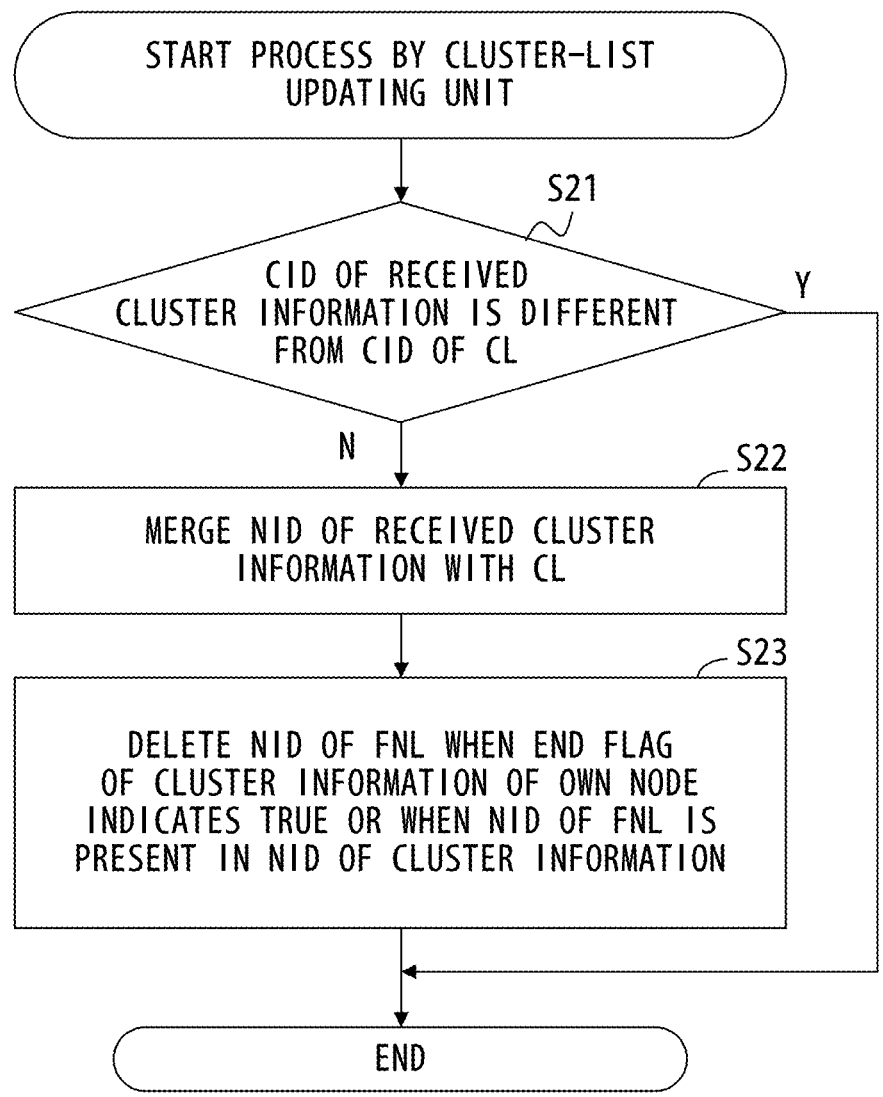
FIG. 12 is a flowchart illustrating exemplary operations performed by a cluster-list updating unit.

FIG. 12 is a flowchart illustrating exemplary operations performed by the cluster-list updating unit 24. The cluster-list updating unit 24 compares a cluster identifier included in cluster information with a cluster identifier included in the cluster list 32 (step S21). When the cluster identifier included in the cluster information is identical with the cluster identifier included in the cluster list 32, the cluster-list updating unit 24 recognizes that the input cluster information is information related to a parent cluster (No in step S21). Accordingly, the cluster-list updating unit 24 updates the cluster list 32 in accordance with the cluster information (step S22). In addition, the cluster-list updating unit 24 deletes, from the free node list 33, the entry of the identifier included in the cluster information from among the node identifiers included in the free node list 33. The cluster-list updating unit 24 also deletes the entry included in the free node list 33 when the end flag of the cluster information of the node that includes this cluster-list updating unit 24 indicates true (step S23). The entry is deleted from the free node list 33 when the end flag of the cluster information of the node indicates true, because a node device 10 is not addable to the parent node. Meanwhile, when the cluster identifier included in the cluster information is not identical with the cluster identifier included in the cluster list 32, the cluster-list updating unit 24 ends the process without performing the processes of steps S22 and S23 (Yes in step S21).

Figure 13:
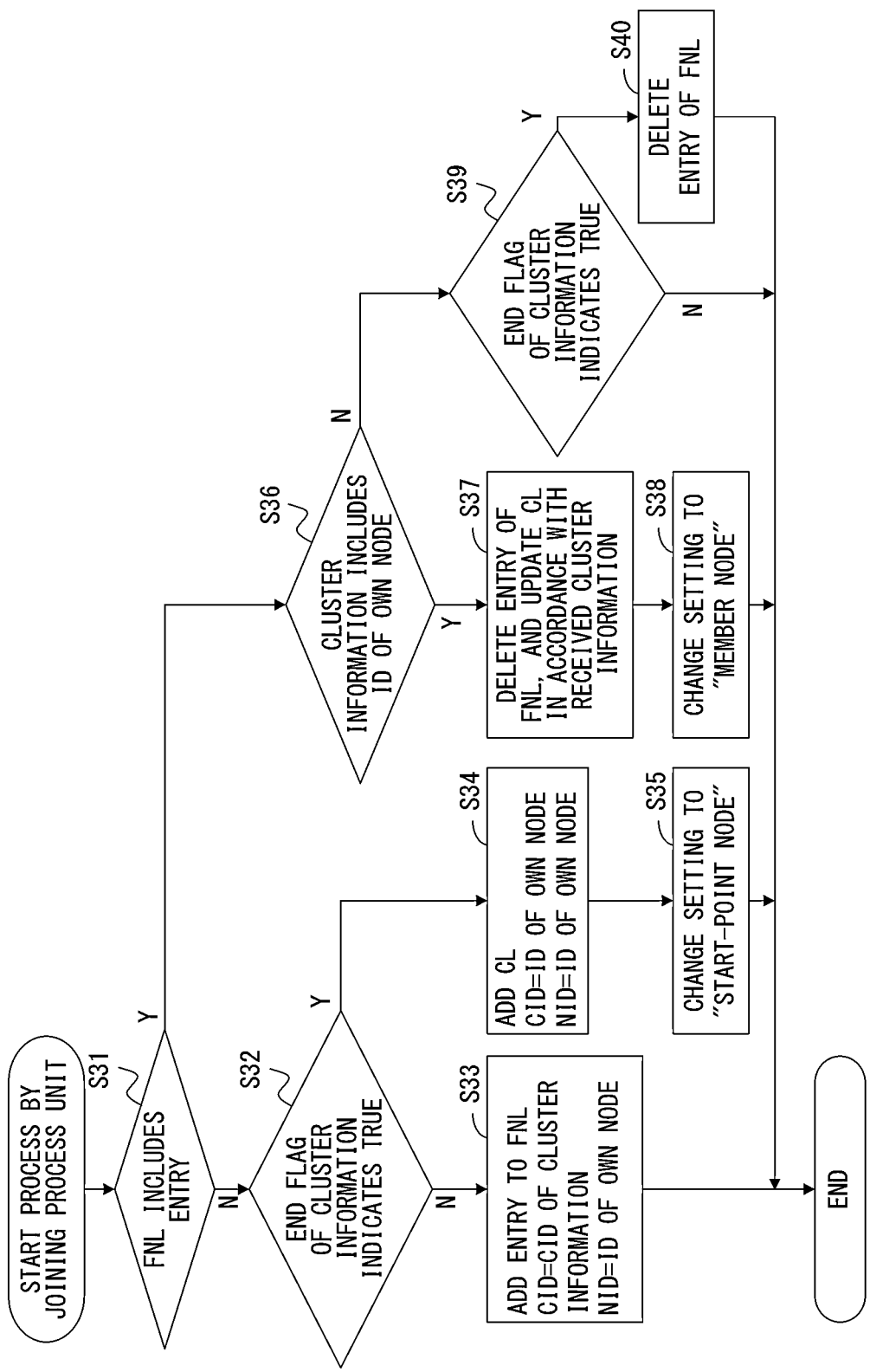
FIG. 13 is a flowchart illustrating exemplary operations performed by a joining process unit.

FIG. 13 is a flowchart illustrating exemplary operations performed by the joining process unit 23. The joining process unit 23 checks whether the free node list 33 includes the entry of the node that includes this joining process unit 23 (step S31). When the free node list 33 does not include the entry of the node, it is checked whether the value of the end flag included in cluster information indicates "true" (No in step S31; step S32). When the value of the end flag does not indicate "true", the joining process unit 23 records the identifier of the node in the free node list 33 in association with the cluster identifier included in the cluster information (No in step S32; step S33). When the value of the end flag indicates "true", the joining process unit 23 generates a cluster list 32 such that the node can be operated as a start-point node (Yes in step S32; step S34). The cluster list 32 has recorded therein the identifier of the node as a cluster identifier, and a newly generated cluster includes the node. In addition, the joining process unit 23 changes the setting of the node to "start-point node" (step S35).

Meanwhile, when the free node list 33 includes the entry of the node, the joining process unit 23 checks whether cluster information includes the identifier of the node (step S36). When the cluster information includes the identifier of the node, the joining process unit 23 deletes the entry of the node from the free node list 33 and records, in the cluster list 32, information on nodes included in the cluster information (Yes in step S36; step S37). In addition, the joining process unit 23 changes the setting of the node to "member node" (step S38). Meanwhile, when the cluster information does not include the identifier of the node, the joining process unit 23 checks whether the value of the end flag included in the cluster information indicates "true" (No in step S36; step S39). When the value of the end flag included in the cluster information does not indicate "true", the joining process unit 23 ends the process (No in step S39). Meanwhile, when the value of the end flag included in the cluster information indicates "true", which indicates that the number of node devices 10 included in the cluster to which a request for permission to join has been made has reached a threshold, the joining process unit 23 recognizes that the node cannot join the cluster (Yes in step S39). Accordingly, the joining process unit 23 deletes the entry of the node from the free node list 33 (step S40). Descriptions will hereinafter be given in detail of a situation in which the processes of steps S39 and S40 are performed.

As described above, in the method in accordance with the embodiment, information used in the generating of a cluster is transmitted and received using a hello packet. Hence, a frequency band within a network that is used to transmit or receive control packets becomes narrow in comparison with what is used in a situation in which control packets, not hello packets, are used to generate a cluster. Accordingly, using the method in accordance with the embodiment may increase the bandwidth usable to transmit and receive packets that include user data.

In addition, in the method in accordance with the embodiment, each node device 10 included in an ad-hoc network autonomously selects a cluster which the node device 10 is to join, and makes a request for permission to join the cluster. Accordingly, a start-point node performs fewer processes to generate a cluster than the processes that would be performed by the start-point node to generate a cluster by, for example, allowing node devices 10 selected by the start-point node to join the cluster. As a result, a node device 10 used as a start-point node can generate a cluster even when processing capacity thereof is low, which means that clusters may be generated even in an ad-hoc network formed of node devices 10 having a low processing capacity.

Control information used to generate a cluster is propagated using a hello packet, thereby preventing flooding of control information from occurring. This may limit the amount of use of processing resources of a node device 100 (MPU 100 and DRAM 106).

In addition, a start-point node makes an adjustment such that the number of node devices 10 that belong to a cluster generated by the start-point node is equal to or lower than a threshold. Hence, as the threshold becomes lower, fewer routes are stored in a routing table after a cluster is generated. Thus, a node device 10 has a decreased load of storing routes to other node devices 10 within a network.

<Second Embodiment>

Figure 14:
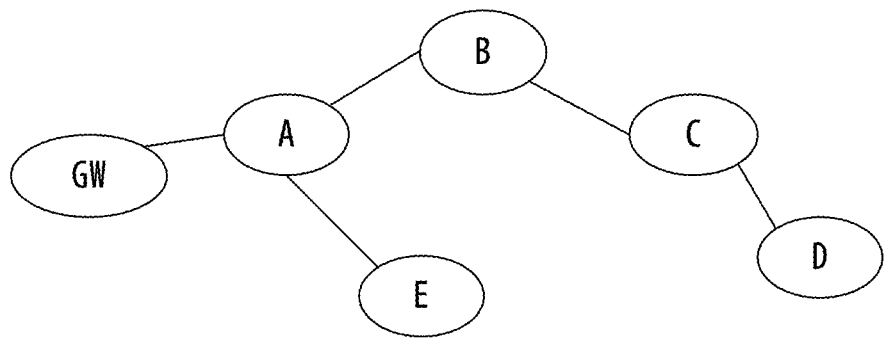
FIG. 14 illustrates an exemplary ad-hoc network in accordance with second and third embodiments.

The present embodiment will be described with reference to processes performed when a node that has requested permission to join a cluster using free node information cannot join the cluster. FIG. 14 illustrates an exemplary ad-hoc network. The ad-hoc network depicted in FIG. 14 includes the six nodes, a node GW, and nodes A-E. In FIG. 14, solid lines link adjacent nodes, as in FIG. 7.

Figure 15:
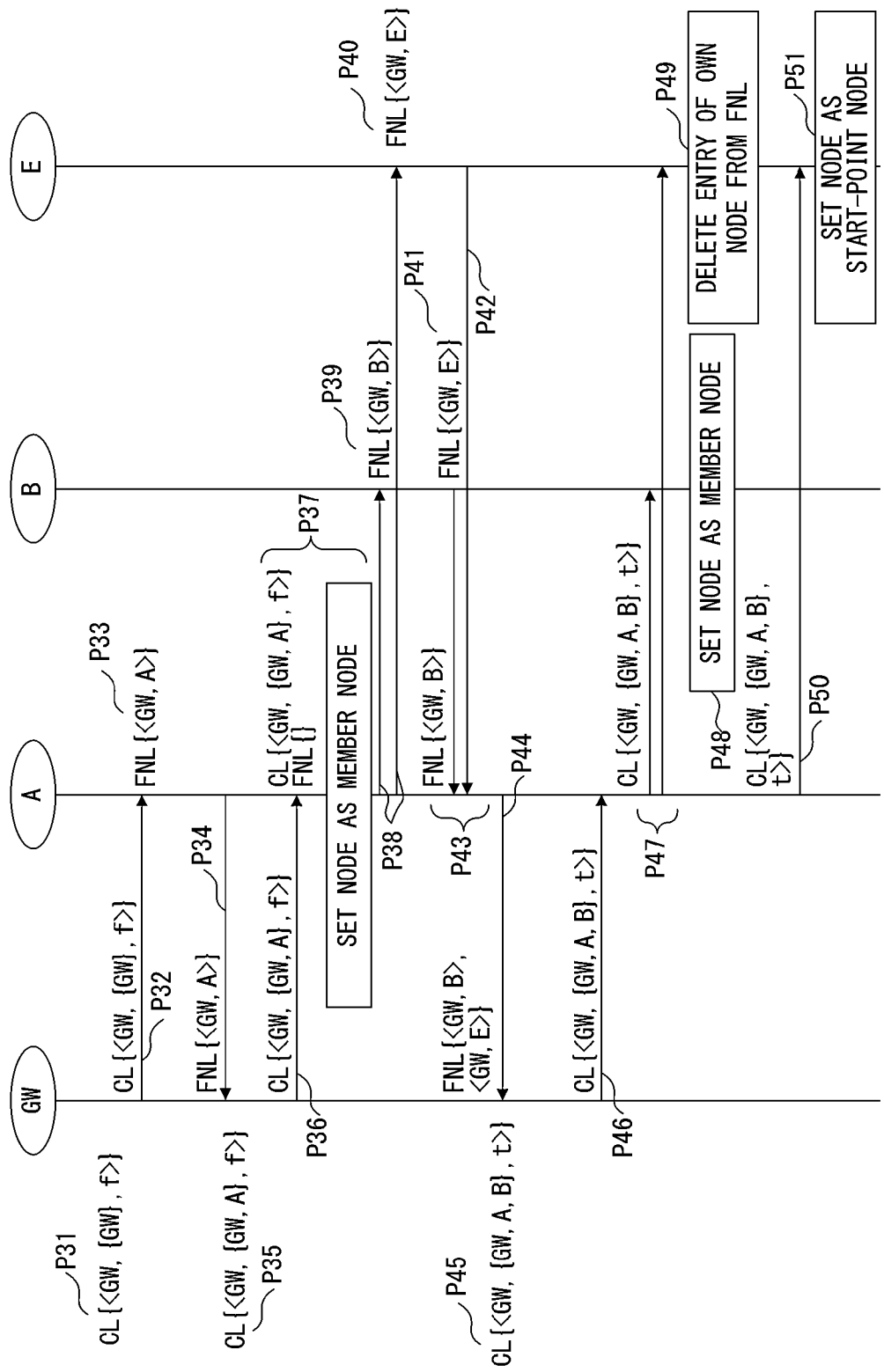
FIG. 15 is a sequence diagram illustrating exemplary operations performed in the generating of a cluster in accordance with the second embodiment.

FIG. 15 is a sequence diagram illustrating exemplary operations performed in the generating of a cluster. FIG. 15 depicts operations performed according to hello packets transmitted and received between the nodes GW, A, B, and E within the ad-hoc network in FIG. 14. In the following, under a condition in which the upper limit (threshold) of the number of node devices 10 within the cluster is 3, descriptions will be given of processes performed when the two node devices 10, the nodes B and E, have made a request for permission to join a cluster GW to which the nodes GW and A belong. Although this example is based on an exemplary situation in which the threshold is 3, the number of node devices 10 within a cluster may be an arbitrary integer that is 1 or larger. Procedures P31-P37 in FIG. 15 are similar to procedures P1-P7, described above with reference to FIG. 8.

Procedure P38 is as follows. The hello-packet generating unit 27 of the node A generates a hello packet. A method for generating such a hello packet and information included in the generated hello packet are similar to those in procedure P8, described above with reference to FIG. 8. The node A broadcasts the generated hello packet. The nodes GW, B, and E, i.e., adjacent nodes of the node A, receive the hello packet transmitted from the node A.

Procedure P39 is as follows. The node B is a free node, and hence the node classification determining unit 22 of the node B extracts cluster information from the received hello packet and then outputs the cluster information to the joining process unit 23. The value of the end flag within the cluster information indicates "false", and thus the joining process unit 23 recognizes that there is a likelihood of being able to join the cluster GW. Accordingly, to enable the node B to join the cluster GW, the joining process unit 23 stores in the free node list 33 the ID of the node B and the identifier of the cluster GW in association with each other.

Procedure P40 is as follows. The node E is also a free node, and hence the joining process unit 23 of the node E processes cluster information included in the hello packet received from the node A. Since the value of the end flag within the cluster information indicates "false", the joining process unit 23 of the node E also recognizes that the node E has a likelihood of being able to join the cluster GW, as with the joining process unit 23 of the node B. Accordingly, the joining process unit 23 of the node E also updates the free node list 33 in order to enable the node E to join the cluster GW. Through this updating process, the combination of the identifier of the node E and the identifier of the cluster GW is stored in the free node list 33.

Procedure P41 is as follows. The hello-packet generating unit 27 of the node B generates a hello packet. The generated hello packet includes information from the free node list 33 of the node B. The node B broadcasts the hello packet to report to the adjacent nodes of the node B (nodes A and C) that the node B has attempted to join the cluster GW.

Procedure P42 is as follows. The hello-packet generating unit 27 of the node E also generates a hello packet. The generated hello packet includes information from the free node list 33 of the node E. Using the hello packet, the node E reports to the adjacent node (node A) that the node E has attempted to join the cluster GW.

Procedure P43 is as follows. The node-list generating unit 26 of the node A recognizes from free node information within the hello packet received from the node B that the node B has attempted to join the cluster GW. In addition, the node-list generating unit 26 recognizes from free node information within the hello packet received from the node E that the node E has attempted to join the cluster GW. Accordingly, the node-list generating unit 26 records, in the free node list 33, both of the nodes B and E in association with the identifier of the cluster GW.

Procedure P44 is as follows. The hello-packet generating unit 27 of the node A generates and broadcasts a hello packet. Information indicating that both of the nodes B and E have attempted to join the cluster GW is recorded in free node information of the hello packet transmitted by the node A.

Procedure P45 is as follows. The node classification determining unit 22 of the node GW outputs to the cluster generating unit 25 the free node information extracted from the hello packet. The cluster generating unit 25 recognizes from the free node information that both of the nodes B and E have attempted to join the cluster GW. In view of the fact that the threshold is 3 and that the nodes GW and A have already joined the cluster GW, the cluster generating unit 25 recognizes that one node device 10 can join the cluster GW but another cannot join the cluster GW. Accordingly, the cluster generating unit 25 selects one of the nodes that have made a request for permission to join the cluster GW as a node to join the cluster GW. The cluster generating unit 25 may use any method for selecting a node to be added to the cluster. The following descriptions are based on the premise that the cluster generating unit 25 has selected the node B as a node to join the cluster GW. The cluster generating unit 25 adds the selected node B to the cluster GW. Through this process, the cluster generating unit 25 changes information in the cluster list 32 as follows.

Cluster identifier: GW
Nodes that have jointed the cluster GW: GW, A, and B
End flag=true Procedure P46 is as follows. As in procedure P6, the node GW generates and broadcasts a hello packet.

Procedure P47 is as follows. When the node A receives the hello packet from the node GW, the cluster-list updating unit 24 of the node A updates the cluster list 32 and the free node list 33 using cluster information within the hello packet. Then, the hello-packet generating unit 27 of the node A generates and broadcasts a hello packet. Information indicating that the nodes GW, A, and B have joined the cluster GW is recorded in cluster information in the hello packet transmitted by the node A. In addition, the end flag is set to true.

Procedure P48 is as follows. When the node B receives the hello packet from the node A, the joining process unit 23 of the node B recognizes that the node B has joined the cluster GW. Accordingly, the joining process unit 23 updates the cluster list 32 and the free node list 33 and, in addition, changes the setting of the node B to "member node".

Procedure P49 is as follows. When the node E receives the hello packet from the node A, the joining process unit 23 of the node E recognizes that the node E has not joined the cluster GW and that a node device 10 is not addable to the cluster GW (end flag=true). Accordingly, since the node E cannot join the cluster for which a request for permission to join has been made using the hello packet transmitted in procedure P42, the joining process unit 23 deletes the entry of the free node list 33 so that the node E can join another cluster. This process allows the node E to make a request for permission to join another cluster, i.e., a cluster that is not the cluster GW, when the node E receives a hello packet from a node device 10 that belongs to this other cluster.

Procedure P50 is as follows. As in procedure P47, the node A broadcasts a hello packet.

Procedure P51 is as follows. The node E receives the hello packet from the node A. Cluster information in the received hello packet includes an identifier to identify the cluster GW and information indicating that a node device 10 is not addable to the cluster GW (end flag=true). Assume that, after the entry of the free node list 33 is deleted in procedure P49, the node E cannot receive a hello packet from a node device 10 that belongs to a cluster that is different from the cluster GW. In this case, the joining process unit 23 of the node E sets the node E as a start-point node and generates a cluster that includes the node E.

Meanwhile, for the nodes B, C, and D, the processes described with reference to procedures P18-P23 are performed, thereby generating a cluster C.

Through the procedures above, even when a node device 10 cannot join a cluster for which a request for permission to join has been made, the node device 10 can make a request for permission to join another cluster. When determining that a request for permission to join cannot be made for any cluster, a node device 10 may start generation of a cluster as a start-point node. In addition, in the embodiment, all pieces of information used in such processes are transmitted and received using hello packets. Hence, the bandwidth within a network that is used to transmit and receive control packets decreases in comparison with the bandwidth used when control packets that are not hello packets are used to generate a cluster.

<Third Embodiment>

The present embodiment will be described with reference to generation of a cluster under a condition in which a member node imposes a limitation such that, as much as possible, the number of node devices 10 reported as nodes that have made a request for permission to join does not exceed the upper limit of the number of nodes that can join the cluster.

In the embodiment, when a member node receives a hello packet that includes free node information, the node-list generating unit 26 of the member node checks whether all of the nodes reported by the hello packet can join a parent cluster. When not all of the nodes reported by the hello packet can join the parent cluster, the node-list generating unit 26 selects nodes to be reported to a start-point node so as to allow this selected nodes to join the parent cluster, and records the identifier of the selected nodes in the free node list 33.

Figure 16:
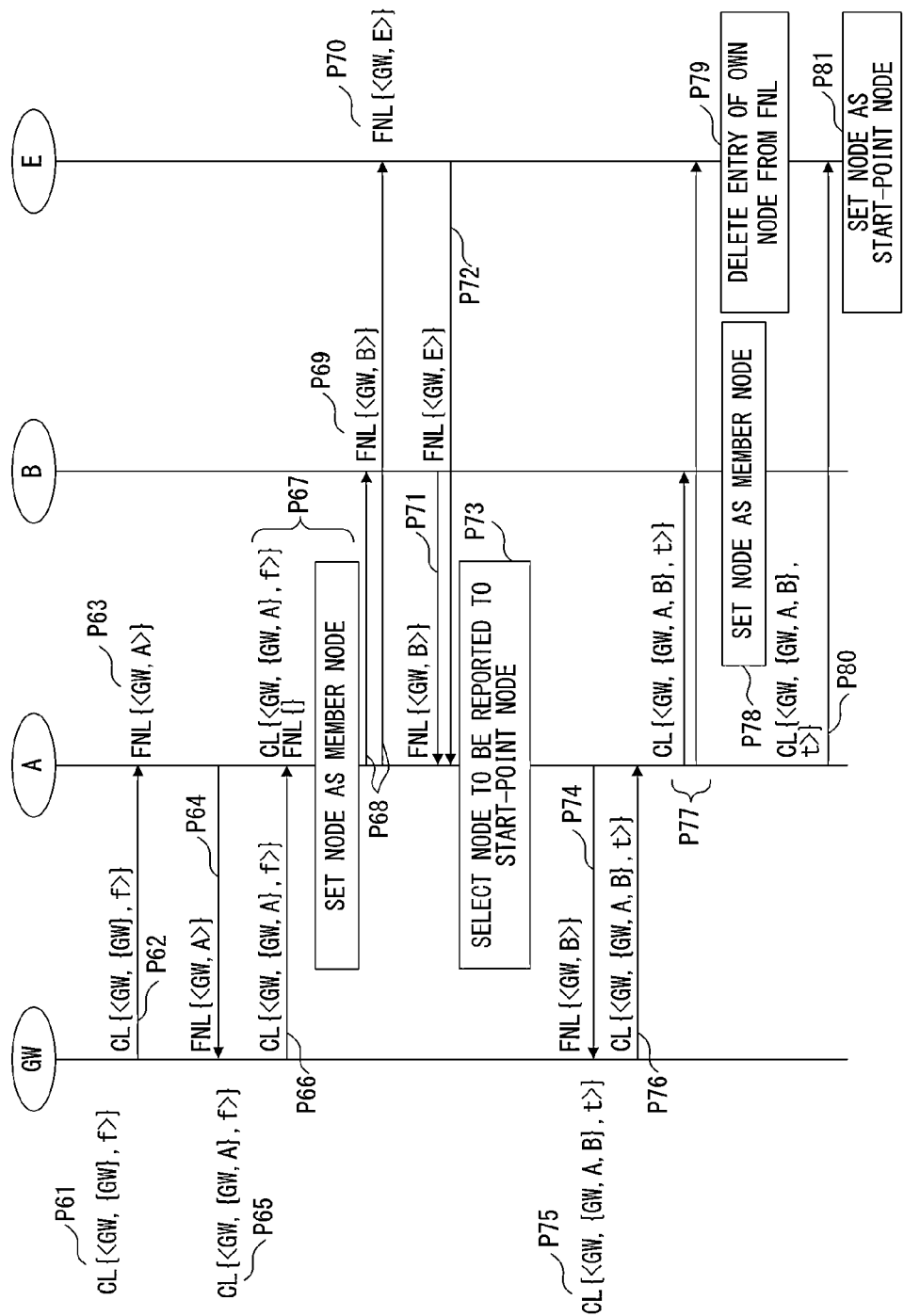
FIG. 16 is a sequence diagram illustrating exemplary operations performed in the generating of a cluster in accordance with the third embodiment.

FIG. 16 is a sequence diagram illustrating exemplary operations performed in the generating of a cluster. The following will describe detailed procedures with reference to FIG. 16. As with FIG. 15, FIG. 16 illustrates operations performed according to hello packets transmitted and received between the nodes GW, A, B, and E within the ad-hoc network depicted in FIG. 14. As in the case of FIG.

15, the following will describe a situation in which the number of node devices 10 that have made a request for permission to join a cluster has exceeded the upper limit of the number of nodes that can belong to the cluster.

Procedures P61-P72 in FIG. 16 are similar to procedures P31-P42, which were described above with reference to FIG. 15.

Procedure P73 is as follows. The node-list generating unit 26 of the node A recognizes from free node information within a hello packet received from the node B that the node B has attempted to join the cluster GW. In addition, the node-list generating unit 26 also recognizes from free node information within a hello packet received from the node E that the node E has attempted to join the cluster GW. The node-list generating unit 26 references the cluster list 32 to check the number of node devices 10 that belong to the cluster GW. At that time, the cluster list 32 includes the following information.

Cluster identifier: GW
Nodes that belong to the cluster GW: GW and A
End flag=false The cluster GW includes two nodes. The upper limit of the number of nodes that can belong to the cluster GW is 3. Hence, the node-list generating unit 26 recognizes that only one of the nodes B and E can join the cluster GW, and selects a node device 10 to be reported as a node that has attempted to join the cluster GW. This example is based on the premise that the node-list generating unit 26 has selected the node B. The cluster generating unit 25 may use any method to select a node to be added to the cluster. The node-list generating unit 26 records in the free node list 33 the identifier of the node B and the identifier of the cluster GW in association with each other.

Procedure P74 is as follows. The hello-packet generating unit 27 of the node A generates and broadcasts a hello packet. Information indicating that the node B has attempted to join the cluster GW is recorded in free node information of the hello packet transmitted by the node A.

Procedure P75 is as follows. The node classification determining unit 22 of the node GW outputs to the cluster generating unit 25 the free node information extracted from the hello packet. The cluster generating unit 25 recognizes from the free node information that the node B has attempted to join the cluster GW. In view of the fact that the threshold is 3 and that the nodes GW and A have already joined the cluster GW, the cluster generating unit 25 causes the node B to join the cluster GW. Through this process, the cluster generating unit 25 changes information in the cluster list 32 as follows.

Cluster identifier: GW
Nodes that have joined the cluster GW: GW, A, and B
End flag=true The processes of procedures P76-P81 are similar to the processes of procedures P46-P51, described above with reference to FIG. 15. In addition, for the nodes B, C, and D, a cluster C is generated through the processes described with reference to procedures P18-P23.

In the embodiment, the node-list generating unit 26 selects a device identifier from the device identifiers within received free node information and adds the selected device identifier to the free node list 33. Accordingly, in the embodiment, step S14 in FIG. 11 from among the operations of the node-list generating unit 26 is changed to an operation of "adding a device identifier selected from the device identifiers within received free node information to the free node list 33". The node-list generating unit 26 may use any method to select a device identifier. The node-list generating unit 26 may, for example, preferentially add an earlier recognized device identifier to the free node list 33. When hello packets include communication quality information, the node-list generating unit 26 may preferentially add the device identifier of a node device 10 with a good communication quality to the free node list 33. In the embodiment, the node-list generating unit 26 also performs the operations of steps S11-S13, which were described with reference to FIG. 11.

In the embodiment, member nodes check whether the number of requests that have been made for permission to join a cluster has exceeded the upper limit of the number of nodes that can belong to the cluster, and the member nodes do not report, to a start-point node, more node-addition reports than the upper limit. This may further decrease the load on the start-point node.

As described above, using the communication methods in accordance with the embodiments decreases the loads on node devices within an ad-hoc network.

The present invention is not limited to the aforementioned embodiments and may be variously varied. As an example, although the descriptions above are based on an exemplary situation in which a cluster identifier is identical with the identifier of a start-point node, cluster identifiers may be identifiers with any format with which individual clusters can be uniquely identified.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node device within a network that includes a plurality of node devices, the node device comprising:
   a receiver configured to receive a packet from an adjacent node device;
   a processor configured to:
      generate a cluster list that records device identification information of a node device included in a cluster from among the plurality of node devices within the network, the cluster being a group of node devices for which route information is stored, and
      generate a first hello packet that is a hello packet used to report the route information with cluster identification information of the cluster being stored in the first hello packet; and
   a transmitter configured to broadcast the first hello packet,
   wherein upon receipt of, from a free-node device that does not belong to a cluster, a second hello packet that includes information that associates the cluster identification information with device identification information of the free-node device, the processor adds the device identification information of the free-node device to the cluster list until a number of node devices recorded in the cluster list reaches a threshold,
   when the number of node devices recorded in the cluster list reaches the threshold, the processor generates a third hello packet that includes a generation request that makes a request to generate another cluster that is different from the cluster, so as to cause a free-node device that has recognized the generation request to start generating the another cluster and to specify a node device included in the another cluster.

2. The node device according to claim 1, wherein
the processor generates a fourth hello packet that includes information recorded in the cluster list, and
the transmitter transmits the fourth hello packet to a node device within the cluster so as to report a node device added to the cluster list to the node device within the cluster that has received the fourth hello packet.

3. A node device within a network that includes a plurality of node devices, the node device comprising:
a receiver configured to receive a packet from an adjacent node device;
a processor configured to:
receive a first hello packet that is a hello packet used to report route information with first information and second information being included in the first hello packet, the first information specifying a node device that belongs to a cluster that is a group of node devices each storing the route information of other node devices within the group, the second information indicating that a number of node devices included in the cluster has not reached a threshold,
decide to join the cluster when the first information does not include device identification information for identification of the node device within the network, and
generate a second hello packet that includes information that associates cluster identification information of the cluster and the device identification information with each other, in order to report to the adjacent node device that the node device within the network has decided to make a request for permission to join the cluster; and
a transmitter configured to broadcast a hello packet generated by the processor,
wherein, upon receipt of a third hello packet that includes third information indicating that the number of node devices included in the cluster has reached the threshold, the processor:
starts to generate another cluster that is different from the cluster,
generates a list to specify node devices included in another cluster, and
generates a fourth hello packet that includes cluster identification information of the another cluster.

4. The node device according to claim 3, wherein the processor
after the second hello packet is broadcast, upon receipt of the third hello packet that includes the first information, checks whether the first information within the third hello packet includes the device identification information,
recognizes that the node device within the network is included in the cluster when the first information within the third hello packet includes the device identification information, and
records the first information within the third hello packet, in a cluster list that records device identification information of each node device that belongs to the cluster to which the node device within the network belongs.

5. The node device according to claim 3, further comprising:
a memory configured to hold a free node list that records device identification information of a request-making node device that is a free-node device and that has made a request for permission to join the cluster, the free-node device being a node device that does not belong to the cluster, wherein
the processor
when a fourth hello packet that has been received includes request-for-permission-to-join information that associates device identification information of a node device that is not recorded in the cluster list with the cluster identification information, adds the request-for-permission-to-join information to the free node list, and
generates a fifth hello packet that includes the free node list, and
the transmitter reports the request-making node device to the adjacent node by transmitting the fifth hello packet.

6. A node device within a network that includes a plurality of node devices, the node device comprising:
a receiver configured to receive a packet from an adjacent node device;
a processor configured to:
receive a first hello packet that is a hello packet used to report route information with first information and second information being included in the first hello packet, the first information specifying a node device that belongs to a cluster that is a group of node devices each storing the route information of other node devices within the group, the second information indicating that a number of node devices included in the cluster has not reached a threshold,
decide to join the cluster when the first information does not include device identification information for identification of the node device within the network,
generate a second hello packet that includes information that associates cluster identification information of the cluster and the device identification information with each other, in order to report to the adjacent node device that the node device within the network has decided to make a request for permission to join the cluster, and
a transmitter configured to broadcast a hello packet generated by the processor;
a memory configured to hold a free node list that records device identification information of a request-making node device that is a free-node device and that has made a request for permission to join the cluster, the free-node device being a node device that does not belong to the cluster, wherein
wherein the processor:
when a fourth hello packet that has been received includes request-for-permission-to-join information that associates device identification information of a node device that is not recorded in the cluster list with the cluster identification information, adds the request-for-permission-to-join information to the free node list, and
generates a fifth hello packet that includes the free node list, and
the transmitter reports the request-making node device to the adjacent node by transmitting the fifth hello packet, and
the processor adjusts a number of node devices to be recorded in the free node list in a manner such that a total of a number of node devices recorded in the cluster list and a number of node devices recorded in the free node list does not exceed a threshold indicating an upper limit of a number of node devices included in the first cluster.

7. A communication method, comprising:

generating, by a start-point node, a cluster list that records identification information of a node device included in a cluster that includes the start-point node;

broadcasting, by the start-point node, a first hello packet that is a hello packet used to report route information with first identification information of the cluster being included in the first hello packet, wherein upon receipt of the first hello packet, a free node that does not belong to a cluster broadcasts a second hello packet that includes route information of the free node after incorporating, into the second hello packet, a list that associates the first identification information with second identification information of the free node, until a number of node devices included in the first cluster reaches a threshold, the start-point node incorporates identification information of the free node recognized using the list into the cluster list, and storing, by a member node that belongs to the first cluster, a route to a node included in the first cluster, when the number of nodes included in the first cluster reaches the threshold, broadcasting, by the start-point node, a third hello packet that includes the first identification information and report information reporting that the number of nodes of the cluster has reached the threshold, and serving as a start point of another cluster and specifying a node device included in the another cluster, by a free node that has received the hello packet that includes the report information.

8. The communication method according to claim 7, further comprising:

broadcasting, by the member node, a fourth hello packet that includes the first identification information, broadcasting, by a free node that has received the fourth hello packet, a fifth hello packet when the fourth hello packet does not include the report information reporting that the number of nodes of the first cluster has reached the threshold, the fifth hello packet including a second list associating the first identification information with third identification information of the free node that has received the fourth hello packet, broadcasting, by the member node that has received the fifth hello packet, a hello packet that includes the second list, and upon receipt of the hello packet that includes the second list, incorporating, by the start-point node, the free node identified by the third identification information into the first cluster when the number of nodes included in the first cluster has not reached the threshold.

* * * * *